(12) United States Patent
De La Huerta Diaz

(10) Patent No.: US 9,409,530 B2
(45) Date of Patent: Aug. 9, 2016

(54) DEVICE FOR PROTECTING THE INSIDE OF VEHICLES

(71) Applicant: Juan Manuel De La Huerta Diaz, Teulada (ES)

(72) Inventor: Juan Manuel De La Huerta Diaz, Teulada (ES)

(73) Assignee: Juan Manuel De La Huerta Diaz, Teulada (Alicante) (ES)

( * ) Notice: Subject to any disclaimer, the term of this patent is extended or adjusted under 35 U.S.C. 154(b) by 0 days.

(21) Appl. No.: 14/426,245

(22) PCT Filed: Aug. 5, 2013

(86) PCT No.: PCT/ES2013/070579
§ 371 (c)(1),
(2) Date: Mar. 5, 2015

(87) PCT Pub. No.: WO2014/091038
PCT Pub. Date: Jun. 19, 2014

(65) Prior Publication Data
US 2015/0217705 A1  Aug. 6, 2015

(30) Foreign Application Priority Data
Dec. 14, 2012 (ES) ................ 201201149 U

(51) Int. Cl.
*B60R 13/01* (2006.01)
*B60R 21/02* (2006.01)

(52) U.S. Cl.
CPC ............. *B60R 13/013* (2013.01); *B60R 13/011* (2013.01); *B60R 21/026* (2013.01)

(58) Field of Classification Search
CPC ...... B60R 13/013; B60R 13/011; B60R 21/04
USPC ............................... 296/39.1, 39.2
See application file for complete search history.

(56) References Cited

U.S. PATENT DOCUMENTS

| 4,516,906 | A | * | 5/1985 | Krein | B65D 90/046 105/355 |
| 4,877,281 | A | * | 10/1989 | Altmann | B60R 13/01 220/495.01 |
| 4,917,431 | A | * | 4/1990 | McDonald | B62D 33/04 296/39.1 |
| 5,506,020 | A | | 4/1996 | Haberkorn | |
| 6,595,568 | B1 | | 7/2003 | Schroeder et al. | |
| 7,178,851 | B1 | * | 2/2007 | Gridley | B60R 13/01 296/39.1 |
| 2003/0178869 | A1 | * | 9/2003 | Adams | B60R 13/01 296/39.1 |
| 2013/0161364 | A1 | * | 6/2013 | Tirrell | B60R 7/02 224/275 |

FOREIGN PATENT DOCUMENTS

BE         1013795 A3    9/2002

* cited by examiner

*Primary Examiner* — Jason S Morrow
(74) *Attorney, Agent, or Firm* — Avery N. Goldstein; Blue Filament Law PLLC

(57) ABSTRACT

The invention relates to a device for protecting the inside of vehicles. Said device comprises: at least one U-shaped arch (1), the shape of which is complementary to the inner shape of the walls (11), roof (12) and/or floor (14) of the inner compartment (13) of a motor vehicle (10), provided with elements (2) for securing to the body, that detachably and dismountably secure the arch (1) to the inside of the inner compartment; and a IV laminar protection cover (3) provided with connecting means (5) that connect to the arches (1) by means of the cooperation of said strips (5) with at least one arch-fixing element (4). The invention provides a device that is easy to install and protects the inside of vehicles that carry loads or aggressive elements that dirty and/or damage the loading area of the inside of the body and/or the upholstery thereof.

20 Claims, 3 Drawing Sheets

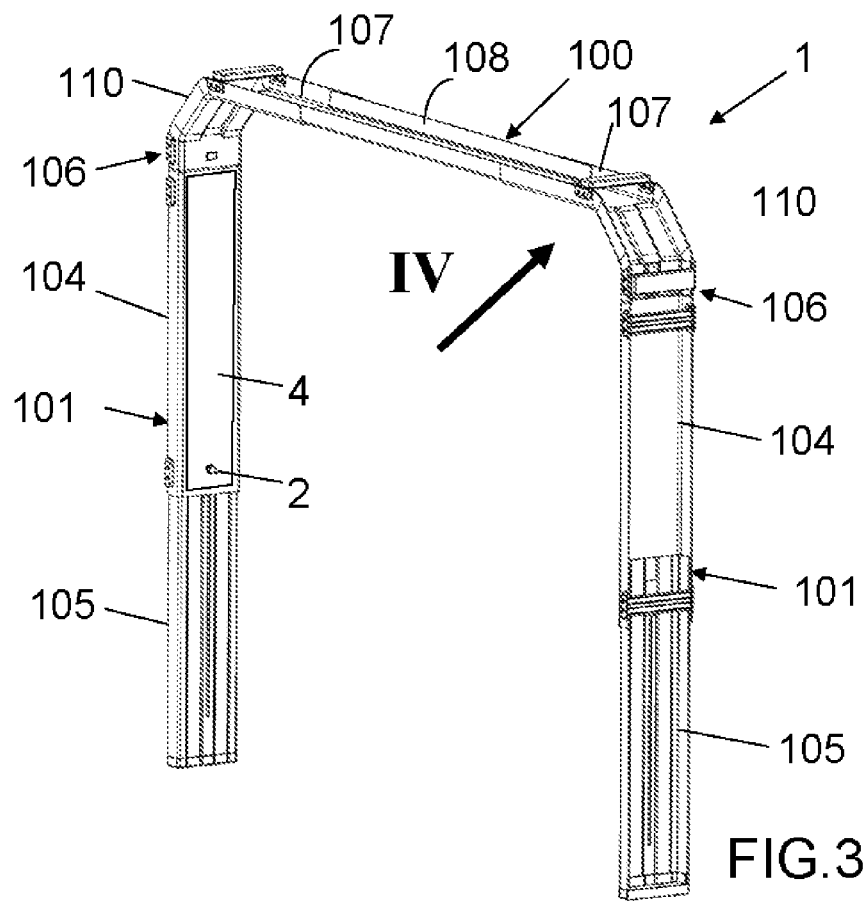
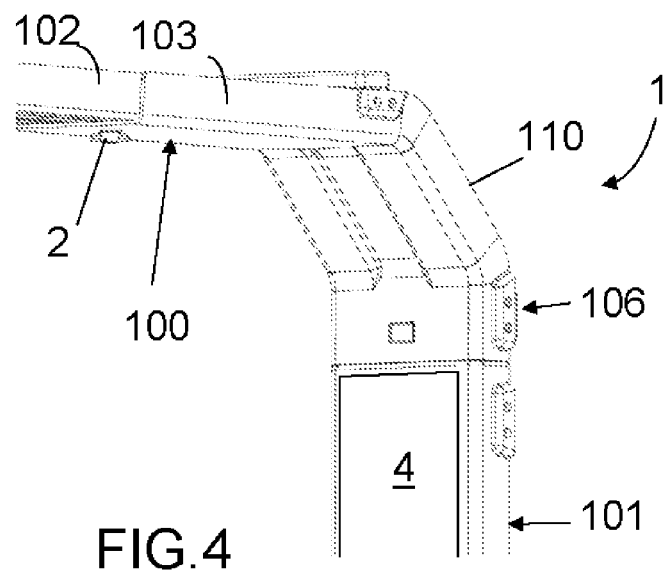

DEVICE FOR PROTECTING THE INSIDE OF VEHICLES

TECHNICAL FIELD OF THE INVENTION

The present invention relates to the automotive sector, and in particular to accessories and complements for cars. More specifically, the present invention relates to a protection device for the interior of vehicles against aggressive loads, especially designed for use at the time of loading elements that can soil and/or damage the part enabled for transport in vehicles.

BACKGROUND OF THE INVENTION

Currently, there are various methods or systems to prevent soiling the inside of a vehicle when determined loads are transported, which given their characteristics tend to soil and/or damage the cabins in a permanent way, such as for example, in the transport of garbage, paints, plasters, cements, pruning waste, etc.

In general, said methods are home-made and are implemented by users or owners of the vehicle themselves, who arrange plastic or fabrics, in the cabins to avoid soiling as much as possible, although generally, these methods tend to have as the main drawback, that they only protect the lower part of said cabins, leaving both the sides and the ceiling of the vehicle without protection, which can become soiled during the transport of said loads.

EXPLANATION OF THE INVENTION

The technical problem that the present invention resolves is to achieve an easily-installable device that protects the inside of the vehicles when said vehicles carry aggressive elements or loads, such as for example: plasters, cements, paints, pruning waste, etc., which soil and/or damage the cargo zone definitively, such as for example, the interior of the bodywork and/or its upholstery. To do this, the protection device for the interior of vehicles forming the object of the present invention is characterised essentially in that it comprises:
- at least one U-shaped arch, complementary to the interior shape of the walls, ceiling, and/or floor of the interior cabin of an automotive vehicle, provided with anchoring elements to the bodywork, which removably and in a manner that can be disassembled anchor the arch to the interior of the cabin; and
- a sheet-like lining for protection provided with joining means, which is joined to the arches by means of said strips with at least one fixing element of the arch.

According to a preferred embodiment of the present invention, the arch comprises posts and crossbeams which are mounted onto the posts by means of joints, the posts and the crossbeams being telescopically extendable to adapt the arch to the internal vertical and horizontal dimension, respectively, of said interior cabin of an automotive vehicle to be protected.

Preferably, said joints are solid with the constituted parts of said crossbeams. According to another characteristic of the present invention, said joining means and said at least one fixing element comprise Velcro® strips.

Alternatively, said joining means said at least one fixing elements comprise clasps, or an adhesive material of chemical origin.

According to another characteristic of the protection device for the interior of vehicles of the present invention, the sheet-like liner for protection comprises a closing element at its mouth.

According to another characteristic of the protection device for the interior of vehicles of the present invention, the arches are fixed to the bodywork of the automotive vehicle.

Throughout the description and the claims, the word "comprises" and its variants do not aim to exclude other technical characteristics, additives, components, or steps. For persons skilled in the art, other objects, advantages, and characteristics of the invention will be inferred in part from the description and in part from the practice of the invention.

The following examples and drawings are provided by way of illustration, and are not intended to limit the present invention. Furthermore, the present invention covers all the possible combinations of specific and preferred embodiments indicated herein.

BRIEF DESCRIPTION OF THE DRAWINGS

Next is a detailed description of the preferred, although not exclusive, modes of embodiment of the device forming the object of the invention, for the improved understanding of which drawings are attached as a non-limiting example. In said drawings:

FIG. 3 is a view in perspective of a preferred mode of embodiment of the U-shaped arches;

FIG. 4 is a view in perspective according to IV of FIG. 3, which illustrated the interior portion of the U-shaped arch of the preferred mode of embodiment, and wherein it is possible to appreciate one of the fixing elements;

DETAILED DESCRIPTION OF THE DRAWINGS

The invention consists of a device designed for the protection of vehicles against the fact of transporting inside loads that could be damaging or prejudicial for the maintenance of the vehicle, such as garbage, paints, plasters, dust, leaves, etc.

Figure 7:
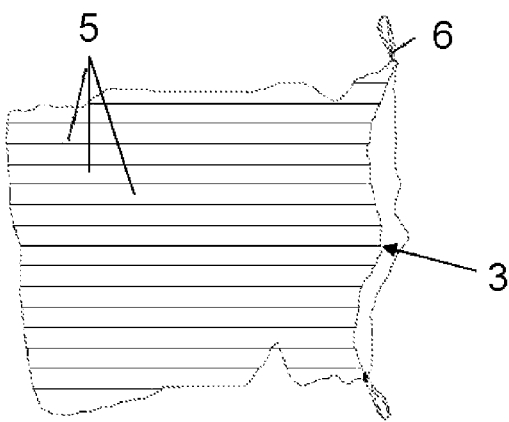
FIG. 7 is a schematic view that illustrates a protection sheet-like element.

In said drawings it can be seen that the protection device 1 according to the present invention consists of two parts:
- U-shaped arches 1, preferably in thermoplastic material, more preferably PVC, provided with fixing elements 4 of Velcro® on their internal face (FIGS. 3 and 4), which are adjusted in the inverted "U" position, to the cargo zone of the vehicle 10 to be protected;
and
- a sheet-like lining 3 for protection, for example a plastic bag having a volume that is approximately that of the zone to be protected, provided with joining strips 5, which is joined to the telescopic arches 1 by means of the collaboration of said strips 5 with at least one fixing element 4 of Velcro® in the U-shaped arch 1. The sheet-like lining 3 for protection comprises a closing element 6 at its mouth (FIG. 7).

FIG. 3 illustrates, in an isometric perspective view, a U-shaped arch 1 according to the preferred embodiment, and FIG. 4 illustrates the interior portion of the U-shaped arch 1 of FIG. 3.

In fact, the U-shaped arches 1 are preferably extendable telescopically to adapt them to the internal vertical and horizontal dimension, respectively, of the walls 11, ceiling 12, and, possibly, the floor 14 of the interior cabin 13 of the vehicle to be protected. To do this, the U-shaped arch U1 comprises posts 101 and a crossbeam 100, which is mounted on to the posts 101 by means of joints 106. The posts 101 and the crossbeam 100 are extendable telescopically. To this effect, the posts 101 are made up of internal profiles 105 which slide telescopically along external profiles 104, while the crossbeam comprises a central profile or piece 108 which slides over end profiles 107.

The end profiles 107 each end on each one of their longitudinal ends, according to the embodiment of the arch 1, in one part of 90° 109 (FIGS. 1 and 6), or on a respective bevel 110 (FIGS. 3 to 5) which incorporates the cited joints 106 of the posts 101 with the crossbeam 100.

Figure 1:
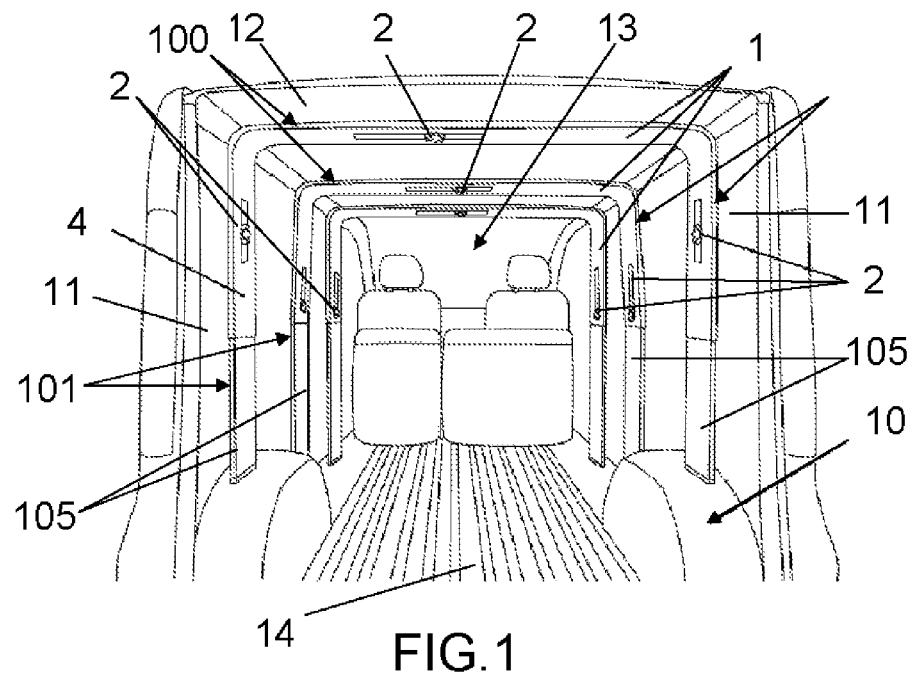
FIG. 1 is a view in perspective which illustrates a protection device forming the object of the present invention, and wherein the U-shaped arches, according to a first mode of embodiment thereof, are shown mounted and installed on a vehicle.
Figure 2:
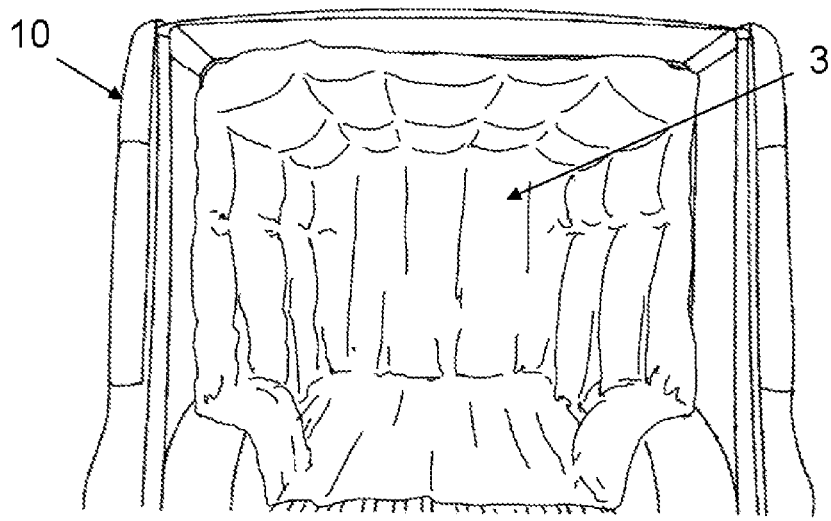
FIG. 2 is a similar view to that of FIG. 1, but showing the sheet-like lining for protection mounted on the U-shaped arches.
Figure 5:
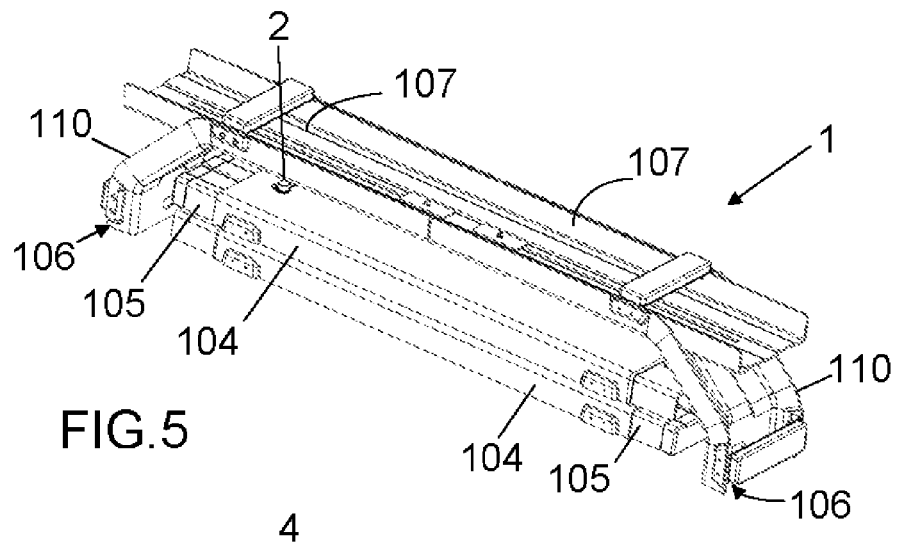
FIG. 5 is a view in perspective showing the U-shaped arch of FIGS. 3 and 4, in their folded position.
Figure 6:
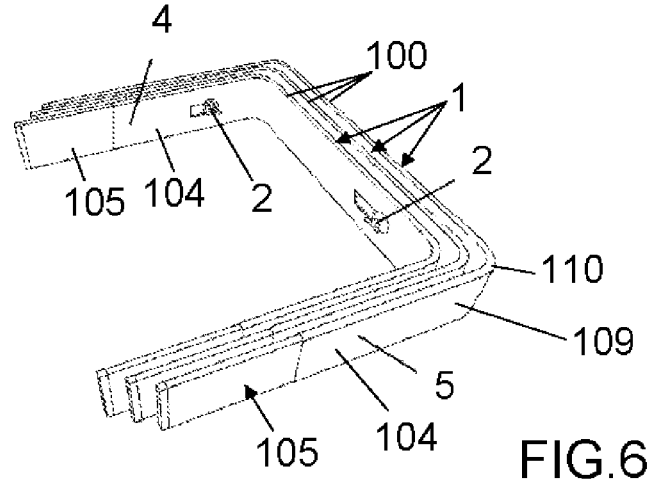
FIG. 6 is a view in perspective of several U-shaped arches of the first mode of embodiment of FIG. 1, in a dismantled position and for transport.

In FIGS. 3 and 4 it is possible to distinguish the fixing elements 4 made of Velcro® on the interior part of the posts 101 of the arch 1. In FIG. 5, additionally, it is possible to appreciate one of the anchoring elements 2 to the bodywork, which anchor removably and in a way that can be disassembled the arch 1 to the interior of the cabin 13, as can be seen in FIG. 1. In the illustrated example, the anchoring elements 2 are of the type known in the art as a "wing nut".

The number of U-shaped arches 1 will vary depending on the length of the cargo zone 6 of the cabin 13, and preferably will be at least two.

The sheet-like lining 3 will generally be embodied in plastic, although other materials having similar resistive characteristics are not dismissed, such as for example, tarpaulin or similar. Its thickness will depend on the level of protection required, and may even be made of tarpaulin. The zone designed to occupy the floor 14 of the cargo zone of the vehicle 1 will have double the thickness of that designed to occupy the walls 11 and ceiling 12. The sheet-like lining 3 for protection comprises a closing element 6 at its mouth.

Alternatively, the U-shaped arches 1, can be integrated into the bodywork of the vehicle 1, in such a way that they do not have to be mounted and dismantled with each use. The sheet-like lining 3, in the case of not sustaining degradation may be reused if required. The device can be made of various materials, although it is conceived for the U-shaped arches to be manufactured preferably out of PVC, although also Polyethylene (PS), Polypropylene (PP), ABS, etc. The sheet-like lining 3 for protection may consist of a plastic bag 20 of different thicknesses. It can also be made of ??

The present invention achieves protection of the cargo zone of a transport vehicle at the same time as ensuring the content of the bag.

Having sufficiently described the nature of the present invention, in addition to a mode of embodiment thereof, it is stated that everything that does not alter, change or modify its fundamental principle is subject to variations in detail. In this sense, it is contemplated for the U-shaped arches to be made preferably of parts formed by profiles of different materials other than thermoplastic, also having considered aluminium or other light metals.

Similarly, the fixing elements 4 and the joining strips 4 could be substituted for clasps or an adhesive material of chemical origin, while remaining within the scope of the inventive concept.

The invention claimed is:

1. A protection device for the interior of vehicles, where the device comprises:
    at least one U-shaped arch, complementary to an interior shape of a set of walls, a ceiling, and/or a floor of an interior cabin of an automotive vehicle, provided with a set of anchoring elements to bodywork that forms the interior cabin, which anchor the arch removably and in a way that can be disassembled to the interior cabin; and
    a lining for protection provided with a set of joining strips, which is joined to the arches with the collaboration of said set of joining strips with at least one fixing element of the arch.

2. The protection device for the interior of vehicles, according to claim 1, wherein said at least one arch further comprises a set of posts and a crossbeam which is mounted to the posts with a set of joints, the posts and the crossbeam being extendable telescopically to adapt the arch to an internal vertical and a horizontal dimension, respectively, of said interior cabin of the automotive vehicle to be protected.

3. The protection device for the interior of vehicles, according to claim 2, wherein said set of joints are solid with a set of end profiles of said crossbeam.

4. The protection device for the interior of vehicles, according to claim 1, wherein said set of joining strips and said at least one fixing element further comprises strips of hook and loop fastener.

5. The protection device for the interior of vehicles, according to claim 1, wherein said set of joining strips and said at least one fixing element further comprises a set of clasps.

6. The protection device for the interior of vehicles, according to claim 1, wherein said set of joining strips and said at least one fixing element further comprises an adhesive material of chemical origin.

7. The protection device for the interior of vehicles, according to claim 1, wherein the lining for protection further comprises a closing element at a mouth of the lining.

8. The protection device for the interior of vehicles, according to claim 1, wherein the arches are fixed to the bodywork of the vehicle.

9. The protection device for the interior of vehicles, according to claim 2, wherein the lining for protection further comprises a closing element at a mouth of the lining.

10. The protection device for the interior of vehicles, according to claim 3, wherein the lining for protection further comprises a closing element at a mouth of the lining.

11. The protection device for the interior of vehicles, according to claim 4, wherein the lining for protection further comprises a closing element at a mouth of the lining.

12. The protection device for the interior of vehicles, according to claim 5, wherein the lining for protection further comprises a closing element at a mouth of the lining.

13. The protection device for the interior of vehicles, according to claim 6, wherein the lining for protection further comprises a closing element at a mouth of the lining.

14. The protection device for the interior of vehicles, according to claim 1, wherein the arches are fixed to the bodywork of the vehicle.

15. The protection device for the interior of vehicles, according to claim 2, wherein the arches are fixed to the bodywork of the vehicle.

16. The protection device for the interior of vehicles, according to claim 3, wherein the arches are fixed to the bodywork of the vehicle.

17. The protection device for the interior of vehicles, according to claim 4, wherein the arches are fixed to the bodywork of the vehicle.

18. The protection device for the interior of vehicles, according to claim 5, wherein the arches are fixed to the bodywork of the vehicle.

19. The protection device for the interior of vehicles, according to claim 6, wherein the arches are fixed to the bodywork of the vehicle.

20. The protection device for the interior of vehicles, according to claim 7, wherein the arches are fixed to the bodywork of the vehicle.

\* \* \* \* \*